US010766640B1

(12) United States Patent
Proicou et al.

(10) Patent No.: US 10,766,640 B1
(45) Date of Patent: Sep. 8, 2020

(54) PAYLOAD INTERPOSER (PIP) SYSTEM AND CONTROL SOFTWARE

(71) Applicant: Triad National Security, LLC, Los Alamos, NM (US)

(72) Inventors: Michael Proicou, Los Alamos, NM (US); Adam Warniment, Los Alamos, NM (US); Paul Stein, Los Alamos, NM (US); Nicholas Dallmann, Los Alamos, NM (US); Daniel Seitz, Los Alamos, NM (US); Logan Ott, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 196 days.

(21) Appl. No.: 15/940,816

(22) Filed: Mar. 29, 2018

(51) Int. Cl.
*B64G 1/64* (2006.01)
*B64G 1/42* (2006.01)

(52) U.S. Cl.
CPC ............ *B64G 1/641* (2013.01); *B64G 1/428* (2013.01)

(58) Field of Classification Search
CPC ............................... B64G 1/641; B64G 1/428
USPC .......................................................... 701/13
See application file for complete search history.

(56) References Cited

U.S. PATENT DOCUMENTS

| | | | |
|---|---|---|---|
| 3,913,109 A | 10/1975 | Owen | |
| 4,475,111 A | 10/1984 | Gittinger et al. | |
| 4,508,404 A | 4/1985 | Frawley | |
| 4,780,727 A | 10/1988 | Seal et al. | |
| 5,040,748 A | 8/1991 | Torre et al. | |
| 5,152,482 A * | 10/1992 | Perkins | B64G 1/22 244/159.4 |
| 5,874,924 A | 2/1999 | Csongor et al. | |
| 5,986,619 A | 11/1999 | Grybos et al. | |
| 7,609,226 B1 | 10/2009 | MacGahan et al. | |
| 7,817,101 B2 | 10/2010 | Cowles | |
| 8,730,124 B2 | 5/2014 | Behrens et al. | |
| 8,970,447 B2 | 3/2015 | Ochoa et al. | |
| 9,067,695 B1 * | 6/2015 | Suh | B64G 1/443 |
| 9,853,353 B2 * | 12/2017 | Judd | B64G 1/425 |
| 10,250,336 B1 * | 4/2019 | Palmer | H04B 10/85 |
| 2006/0073723 A1 | 4/2006 | Cowgill et al. | |
| 2007/0125910 A1 * | 6/2007 | Cepollina | B64G 4/00 244/172.6 |
| 2010/0037932 A1 | 2/2010 | Erez et al. | |
| 2010/0319956 A1 | 12/2010 | Ballard et al. | |
| 2012/0160294 A1 | 6/2012 | Phu et al. | |

(Continued)

OTHER PUBLICATIONS

ESTCube-1 Wikipedia Page, https://en.wikipedia.org/wiki/ESTCube-1 (last accessed Apr. 24, 2014).

(Continued)

*Primary Examiner* — Yazan A Soofi
(74) *Attorney, Agent, or Firm* — LeonardPatel P.C.; Michael Aristo Leonard, II; Sheetal Suresh Patel

(57) ABSTRACT

A payload interposer (PIP) system and its control software provide an interface between a space vehicle and a payload. The PIP board facilitates power and communications between a command and data handler (CDH) of the space vehicle and the payload. A microcontroller of the PIP board may control operation of the payload, format messages between the space vehicle and the payload, and extract data from the payload for downlink via the space vehicle.

18 Claims, 11 Drawing Sheets

(56) References Cited

U.S. PATENT DOCUMENTS

2014/0253410 A1    9/2014  Dinallo et al.
2016/0264266 A1*   9/2016  Stone ................... B64G 1/62

OTHER PUBLICATIONS

Justin M. Benedik, "Final Office Action", dated Sep. 26, 2017, U.S. Appl. No. 14/746,046.
Justin M. Benedik, "Non-Final Office Action", dated May 18, 2017 for U.S. Appl. No. 14/746,046.
Justin M. Benedik, "Notice of Allowance", dated Nov. 30, 2017, U.S. Appl. No. 14/746,046.
Non-final Office Action issued in U.S. Appl. No. 14/745,763 dated Feb. 10, 2017.
Restriction Requirement issued in U.S. Appl. No. 14/745,763 dated Oct. 4, 2016.
Restriction Requirement issued in U.S. Appl. No. 14/746,046 dated Feb. 14, 2017.
Space Micro MSS-01,02 Medium Sun Sensors Brochure, http://www.spacemicro.com/assets/datasheets/guidance-and-nav/MSS.pdf (May 2, 2014).
The JSON Data Interchange Syntax, http://www.ecma-international.org/publications/files/ECMA-ST/ECMA-404.pdf (last accessed Mar. 29, 2018).
Trinh Vo Dinh, "Final Office Action", dated Jul. 10, 2017, U.S. Appl. No. 14/745,763.
Trinh Vo Dinh, "Notice of Allowance", dated Oct. 12, 2017, U.S. Appl. No. 14/745,763.
Justin M Benedik, "Non-Final Office Action", dated May 27, 2020, U.S. Appl. No. 15/872,630.

* cited by examiner

PAYLOAD INTERPOSER (PIP) SYSTEM AND CONTROL SOFTWARE

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD

The present invention generally relates to space vehicle systems, and more particularly, to a payload interposer (PIP) system and control software that provides an interface between a space vehicle and a payload.

BACKGROUND

Traditional multi-mission satellites consist of a satellite bus that provides basic satellite functionality, including power, communications, and attitude control, with a provision to host one or more payloads and the ability to command payloads from the ground. Traditional satellite busses cost tens to hundreds of millions of dollars and have detailed and complex payload and command interfaces, which substantially increase costs and development time. Moreover, the payload sections are typically volume, shape, and power-constrained, forcing the payload designer to design around the satellite bus, which can result in undesirable performance, higher costs, and increased risks.

In recent years, CubeSats have emerged as an alternative to traditional space solutions. CubeSats are relatively simple and can be developed with a more rapid turnaround. For space missions with smaller power and equipment capability requirements, CubeSats may offer the potential for an out-of-the-box solution where the same satellite can be used for different missions based on mission-specific software. CubeSats can typically be produced and purchased for a lower cost than conventional satellite systems, and have a higher availability for launch since they can be deployed by smaller, more widely available, less costly secondary payload launch options. Indeed, multiple CubeSats can be launched simultaneously in a "dispenser."

However, conventional CubeSats present a number of major design challenges for many missions, particularly for a multi-mission satellite bus. For instance, conventional CubeSats have very limited power and volume. Also, a design team still has to account for all normal effects of space operation (e.g., radiation, thermal management, launch envelope, etc.) without the benefit of traditional space components, and with little design margin in order to create a functional space vehicle. As a result, most conventional CubeSats have been plagued with issues of poor reliability, short lifetime, and poor performance. In fact, many conventional CubeSats fail to even turn on and make initial contact.

Extending CubeSats to provide a multi-mission bus capability has proven especially difficult. Previous attempts at producing multi-mission CubeSats have yielded satellites with relatively high costs, very little power and volume left for the payload section, and payload interfaces that are complex and/or limited in functionality. This leads to higher costs, longer development times, and poor reliability. Extending these designs to larger form factors is thus highly problematic. Accordingly, an improved approach for space vehicle payload development, testing, and interfacing may be beneficial.

SUMMARY

Certain embodiments of the present invention may provide solutions to the problems and needs in the art that have not yet been fully identified, appreciated, or solved by conventional space vehicle payload interfaces. For example, some embodiments of the present invention pertain to payload interposer (PIP) system and control software that provides an interface between a space vehicle and a payload.

In an embodiment, a PIP system includes a space vehicle including a command and data handler (CDH), a payload, and a PIP board that includes a microcontroller. The PIP board facilitates power and communications between the space vehicle and the payload. Control software for the microcontroller is configured to control operation of the payload, format messages between the space vehicle and the payload, and extract data from the payload for downlink via the space vehicle.

In another embodiment, a PIP board includes memory storing computer program instructions and a microcontroller configured to execute the computer program instructions. The instructions are configured to cause the microcontroller to control operation of a payload, format messages between a space vehicle and the payload, and extract data from the payload for downlink via the space vehicle.

In yet another embodiment, a space vehicle includes a CDH. The CDH is configured to cause a PIP board to switch between maintenance and operational modes, enable/disable power to a payload, enable/disable sequencing of payload commands, and provide commands for managing payload data files.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments of the present invention pertain to a payload interposer (PIP) system and control software that provides an interface between a space vehicle and a payload. In order to more rapidly develop and deploy payloads for space applications, a payload may be interconnected with a space vehicle via a PIP board. Payload development may be facilitated in a manner that "abstracts" the hardware of the space vehicle from the payload developer. In other words, communications, power systems, attitude determination and control systems (ADCS), command and data handler (CDH), etc. may all be provided in a "stock" space vehicle that the payload developer may not even need to obtain when developing the payload. Rather, the PIP board and its control software may be used to ensure that the payload will properly communicate with the space vehicle, and vice versa, once development is completed.

Figure 1:
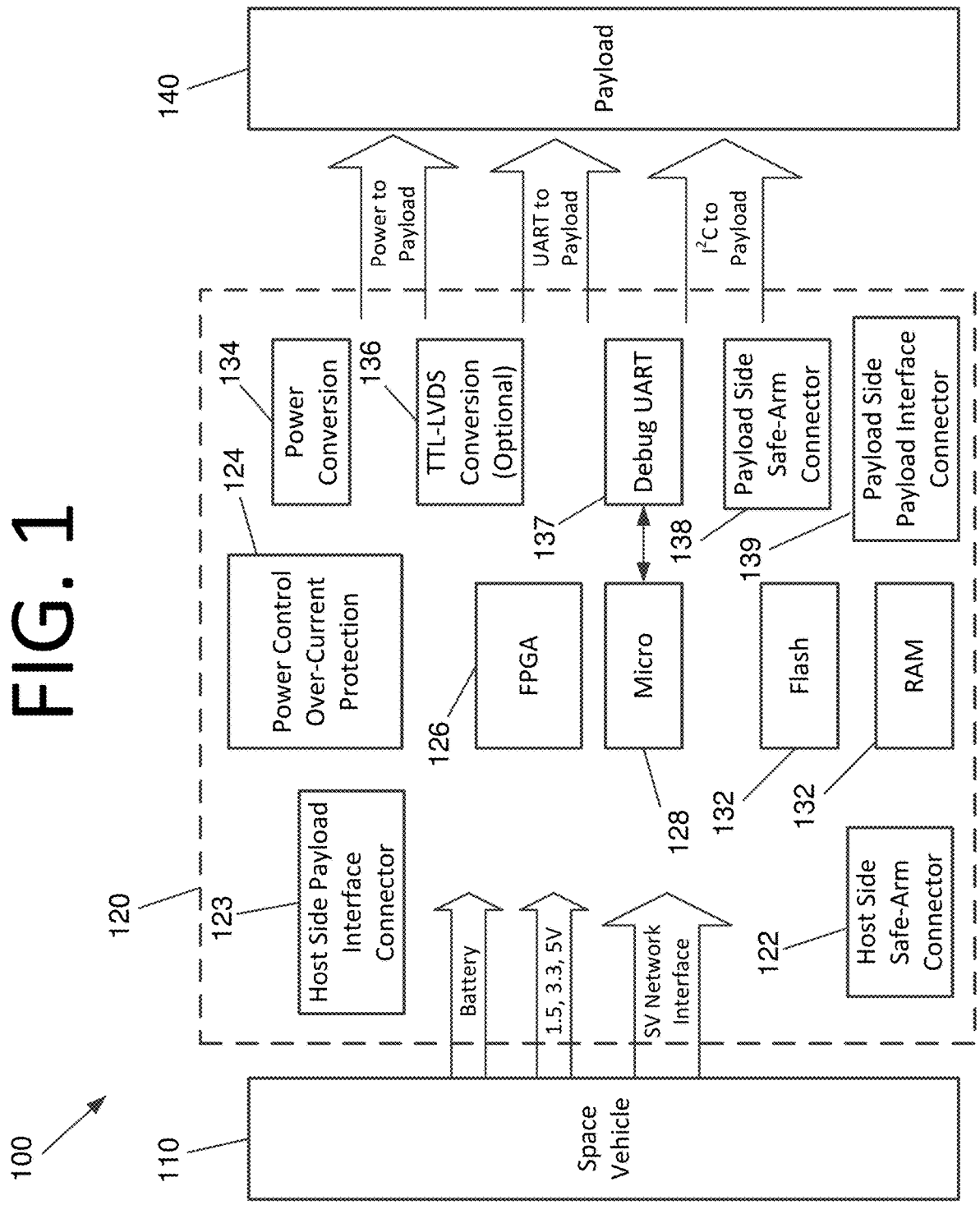
FIG. 1 is a functional diagram illustrating an integrated space vehicle and payload system, according to an embodiment of the present invention.

FIG. 1 is a functional diagram illustrating an integrated space vehicle and payload system 100, according to an embodiment of the present invention. Integrated space vehicle and payload system 100 may be non-flight-ready or flight-ready without deviating from the scope of the invention. A space vehicle 110 provides +1.5V, +3.3V, and +5V power, bulk payload power from batteries, and a network interface to a PIP board 120. PIP board 120, in turn, provides power, a universal asynchronous receiver-transmitter (UART) interface, and an I²C interface to payload 140.

PIP board 120 uses a field programmable gate array (FPGA) 126 to allow routing of different signals between a microcontroller 128, the on-board components, and connectors 122, 123, 138, 139. Host side payload interface connector 123 provides communications for payload 140 from space vehicle 110 to PIP board 120. Payload side payload interface connector 139 routes power, UART, and I²C to payload 140 in this embodiment. FPGA 126 implements the circuit routing, system watchdogs, and other functionality required in the space vehicle architecture in this embodiment. Power to payload 140 is controlled by a Payload_PowerEnable line, as well as by FPGA 126 in this embodiment. Thus, FPGA 126 allows software of PIP board 120 to control power to payload 140. An over-current protection circuit 124 protects PIP board 120 and space vehicle 110 from damage due to current surges, and is controlled by code of FPGA 126.

Microcontroller 128 may be used to direct communications between space vehicle 110 and payload 140. Microcontroller 128 may also be used to control payload 140, format messages to and/or from payload 140, extract data for downlink and other payload-specific functions, etc. Microcontroller 128 may include a relatively large number of unused interfaces (e.g., one or more UART, serial peripheral interface (SPI), and I²C interfaces) that may be made available to payload 140. Microcontroller 128 also includes software that controls power to payload 140 separate from PIP board 120 itself. In other words, microcontroller 128 can operate for system maintenance (e.g., file transfer, reprogramming, etc.) without the additional power draw of payload 140. Flash 130 may provide a file system for persistent storage, and random access memory (RAM) 132 may provide temporary storage.

Space vehicle 110 should be made safe for transport and to satisfy launch provider requirements. "Safing" space vehicle 110 typically requires disabling the power supply (i.e., batteries) onboard. An externally accessible payload side safe-arm connector 138 provides safe-arm functionality. Space vehicle 110 should be "armed" before launch by inserting a safe-arm plug (not shown). Space vehicle 110 and attached payload 140 are typically powered down and inoperable until the safe-arm plug is installed. Debug UART 137 is used for development and testing of the software of microcontroller 128 and appears on externally accessible payload side safe-arm connector 138 so that it can be accessed while space vehicle 110, PIP board 120, and payload 140 are mated in flight configuration.

Power conversion circuitry 134 converts power to a form usable by payload 140. Low voltage transistor-transistor logic (TTL) signaling from space vehicle 110 may be converted to a low voltage differential signaling (LVDS) by TTL-LVDS conversion circuitry 136, if required by payload 140. In this embodiment, there are two available interfaces—a UART interface and an I²C interface—that are provided to payload 140. These signals may be routed through FPGA 126, which allows flexibility in pin assignments between microcontroller 128 and host side payload interface connector 139. Reprogramming FPGA 126 allows for otherwise unused interfaces of microcontroller 128 to be routed to payload 140 via host side payload interface connector 139. PIP board 120 can then support various embodiments of payload 140 with unique and/or varying interfacing requirements.

Figure 2:
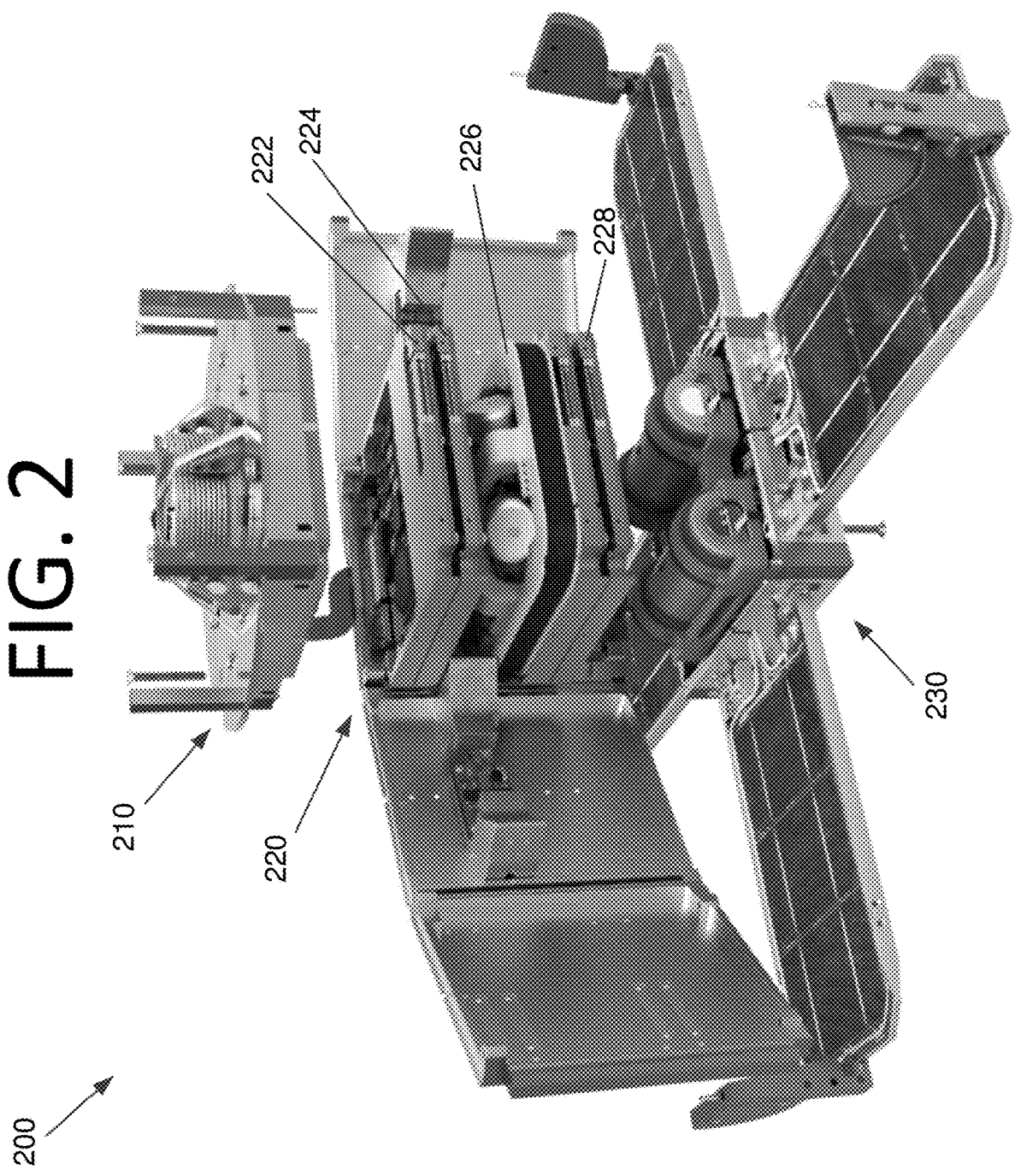
FIG. 2 is an exploded perspective view illustrating a CubeSat with an opened chassis, according to an embodiment of the present invention.

FIG. 2 is an exploded perspective view illustrating a CubeSat 200 with an opened chassis, according to an embodiment of the present invention. The bottom of CubeSat 200 (not visible in this view) may be configured to connect to, and interface with, a payload section and a PIP board. See, e.g., FIGS. 3 and 4. CubeSat 200 includes a top section 210 including radio frequency (RF) components, a middle section 220 including circuitry, and a bottom section 230 including power components (e.g., batteries, solar panels, power circuitry, etc.). Middle section 220 includes a high band digital radio 222, a low band digital radio 224, an ADCS 226, and a CDH 228.

Figure 3:
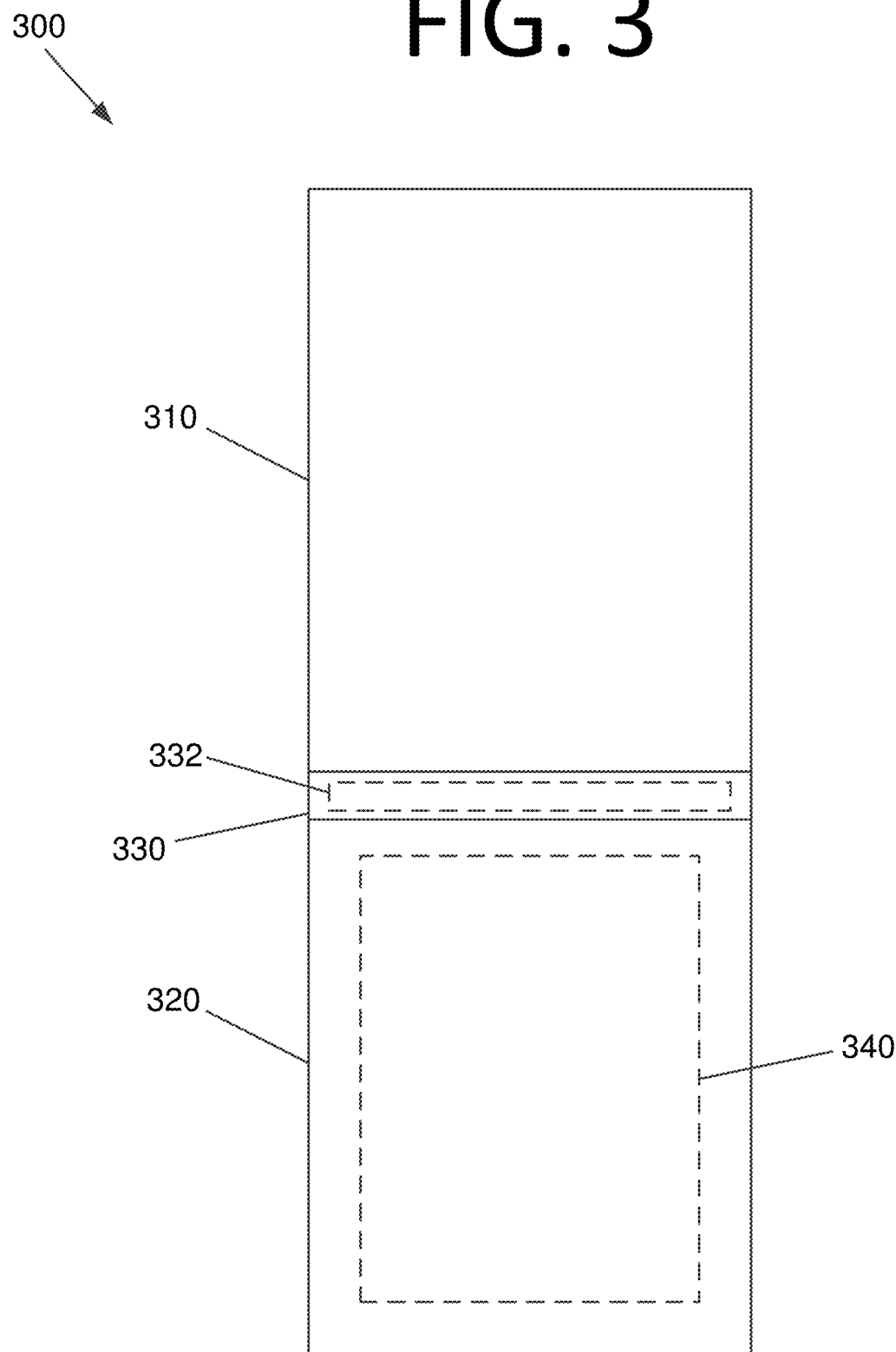
FIG. 3 is a side view illustrating a space vehicle system, according to an embodiment of the present invention.

FIG. 3 is a side view illustrating a space vehicle system 300, according to an embodiment of the present invention. It should be noted that while shown as generic rectangles, the components of space vehicle system 300 may have any desired shape, size, and/or configuration without deviating from the scope of the invention. A space vehicle 310 is operably connected to a separable payload section 320. In some embodiments, space vehicle 310 may be space vehicle 110 of FIG. 1. A PIP plate 330 at one end of payload section 320 operably connects to space vehicle 310, allowing pins (not shown) of PIP board 332 to be connected to respective connectors (not shown) of space vehicle 310. PIP plate 330 may be attached to space vehicle 310 in some embodiments via screws, rivets, fasteners, or any other suitable connection mechanism without deviating from the scope of the invention. A payload 340 is housed within payload section 320 and interfaces with space vehicle 310 via PIP board 332. Electrical connections between space vehicle 310 and payload 340 are provided via PIP board 332.

Figure 4:
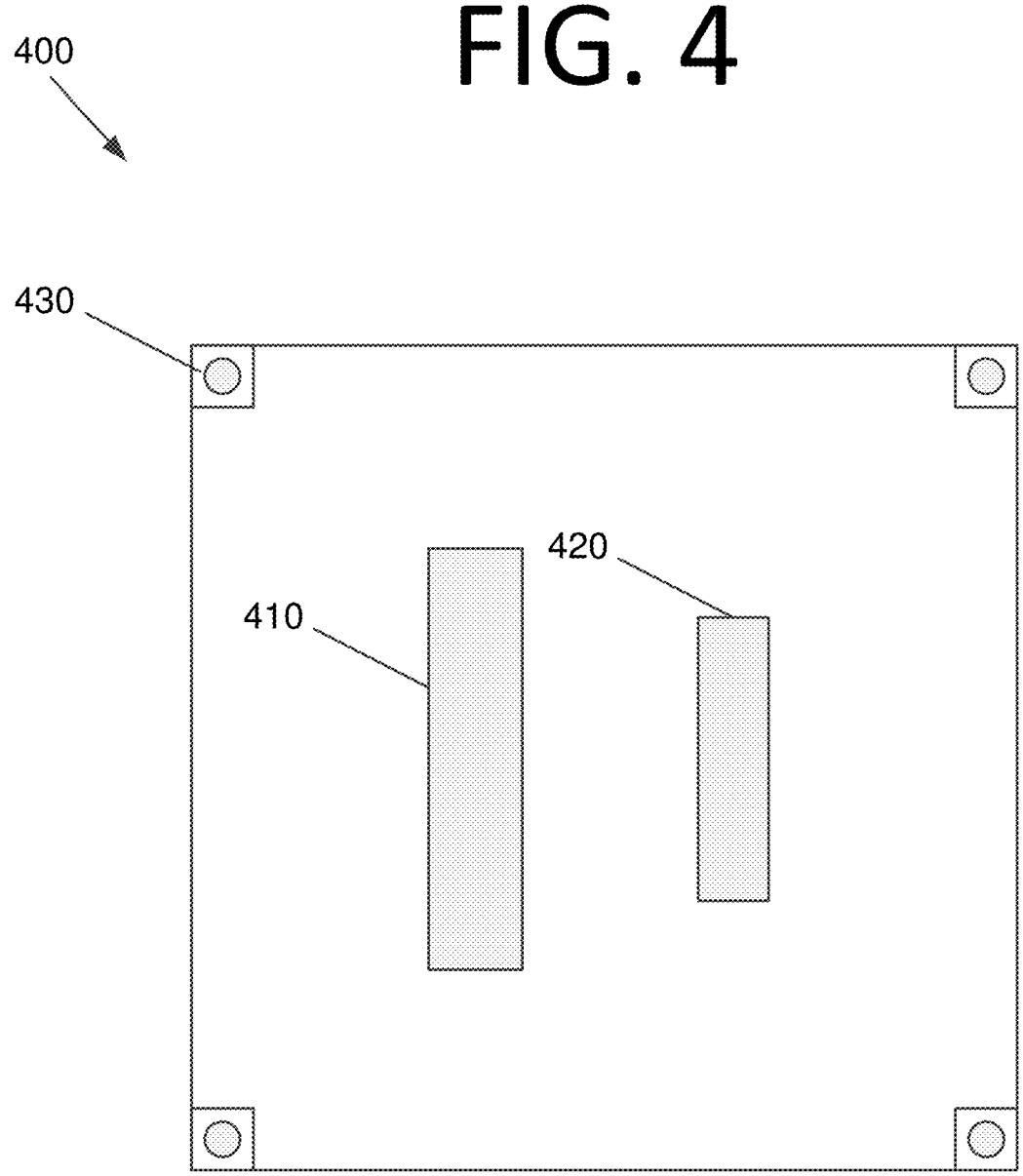
FIG. 4 is a bottom view illustrating a space vehicle, according to an embodiment of the present invention.

FIG. 4 is a bottom view illustrating a space vehicle 400, according to an embodiment of the present invention. Space vehicle 400 is configured to interface with pins from a PIP board of a payload section. More specifically, a PIP interface 410 that is configured to connect with a host side payload interface connector of the PIP board and a safe-arm interface 420 configured to connect with a host side safe-arm connector of the PIP board are included. In this embodiment, four screw holes 430 allow connection of a payload section to space vehicle 400 via screws.

Figure 5A:
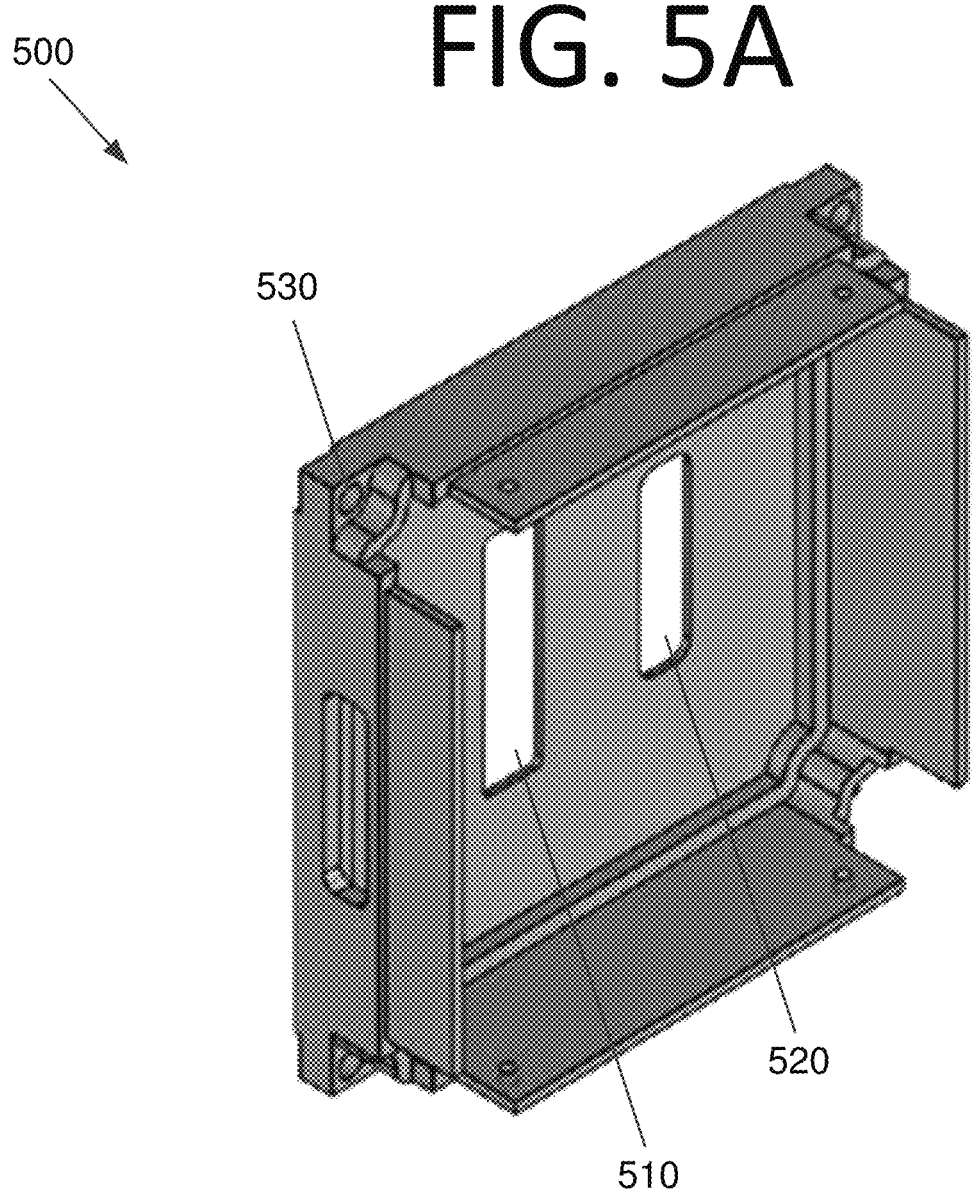
FIG. 5A is a perspective view illustrating a PIP plate, according to an embodiment of the present invention.
Figure 5B:
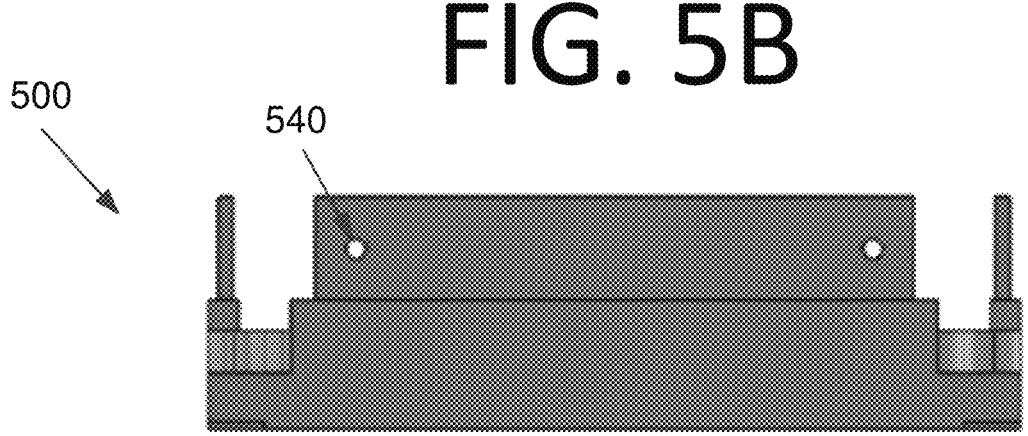
FIG. 5B is a side view illustrating the PIP plate of FIG. 5A, according to an embodiment of the present invention.

FIGS. 5A and 5B are perspective and side views, respectively, illustrating a PIP plate 500, according to an embodiment of the present invention. PIP plate 500 includes openings 510, 520 through which host side payload interface connector pins and host side safe-arm pins can pass, respectively. Screw holes 530 allow PIP plate 530 to be connected to a space vehicle. Payload section screw holes 540 allow PIP plate to be connected to a payload section as a part thereof.

Figure 6A:
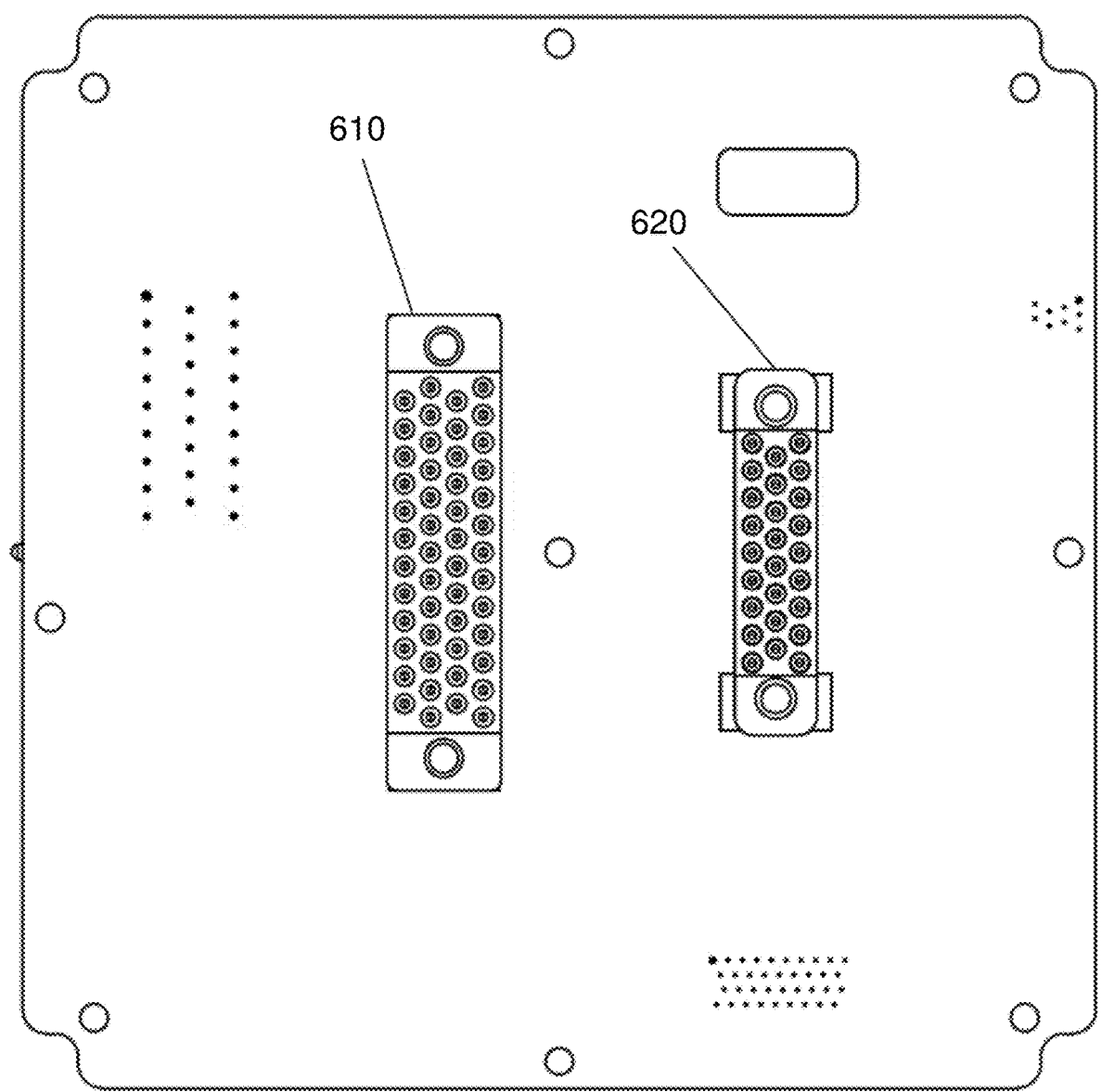
FIG. 6A illustrates a top view of a PIP board, according to an embodiment of the present invention.
Figure 6B:
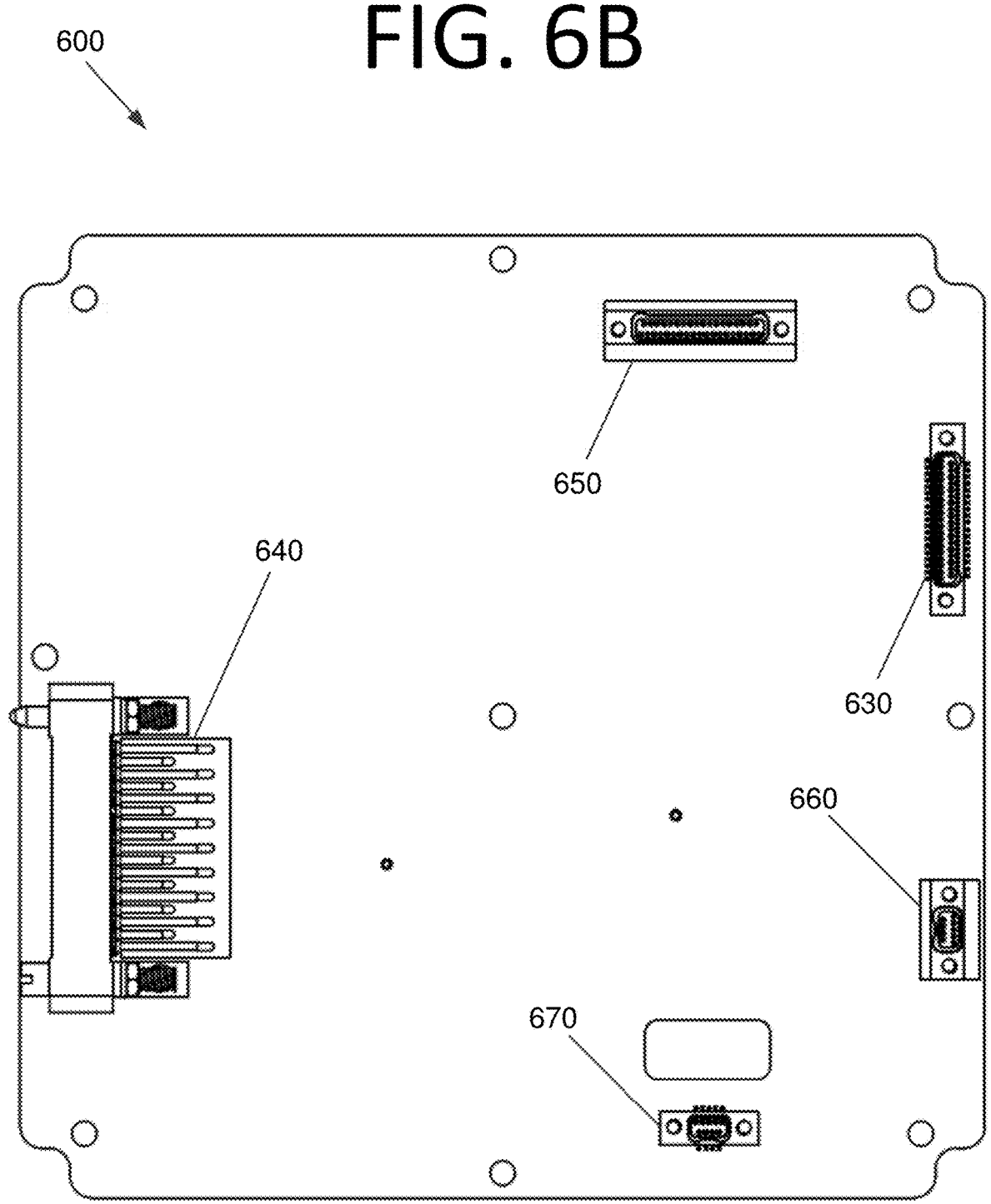
FIG. 6B illustrates a bottom view of the PIP board of FIG. 6A, according to an embodiment of the present invention.
Figure 6C:
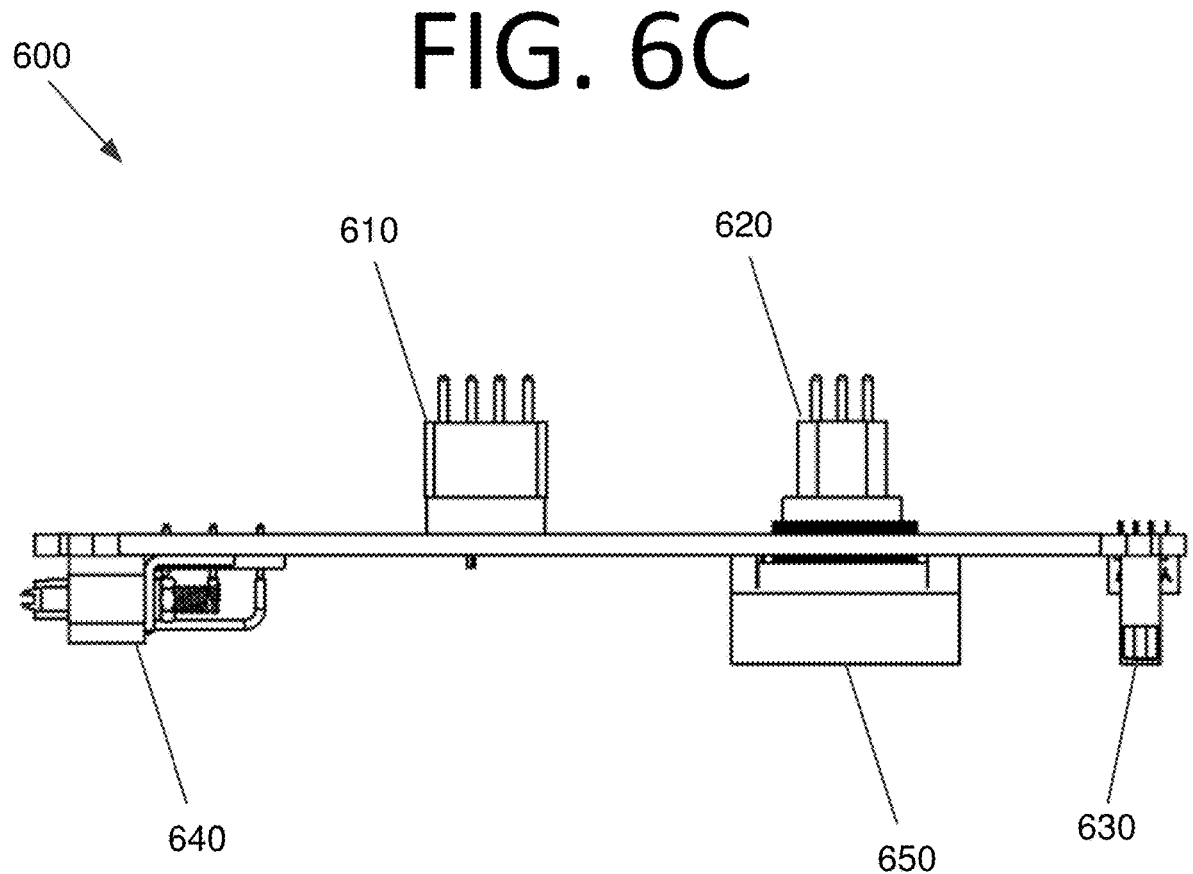
FIG. 6C illustrates a side view of the PIP board of FIG. 6A, according to an embodiment of the present invention.

FIGS. 6A-C illustrate top, bottom, and side views, respectively, of a PIP board 600, according to an embodiment of the present invention. PIP board 600 includes a host side payload interface connector 610 and a host side safe-arm connector 620 extending from its top in this embodiment that interface with respective connectors of a space vehicle. PIP board 600 also includes a payload side payload interface connector 630 and a payload side safe-arm connector 640 extending from its bottom in this embodiment that interfaces with a payload. Payload side payload interface connector 630 interfaces between PIP board 600 and the payload. Payload side safe-arm connector provides external access to the safe-arm functionality of the payload. PIP board 600 further includes a star tracker connector 650, a sun vector sensor connector (from host) 660, and a sun vector sensor connector (to payload) 670. Connectors 650, 660, 670 provide star tracker and sun vector sensor information to PIP board 600 for use by the space vehicle. It should be noted that connectors 650, 660, 670 are not present in some embodiments, and may be generally unrelated to PIP board functionality.

Space Vehicle Commanding and Payload Operations

The software that is needed to support a specific payload can vary significantly. The microcontroller of the PIP board may be used to control the payload, format messages to and/or from the payload, extract data for downlink, and/or perform other payload-specific functions. In some embodiments, the PIP board can be operated in two modes dictated by software: maintenance mode and operational mode. In maintenance mode, power to the payload may be disabled and the microcontroller of the PIP board may otherwise operate normally. This allows access for general space vehicle functions (e.g., file transfer (uplink or downlink), code upload and reprogramming, etc.).

In operational mode, the payload is powered on and is capable of performing its mission operations. All maintenance mode commands may be accepted while in operational mode in some embodiments. However, some operations, such as reprogramming the PIP board microcontroller, will disrupt payload operations. In some embodiments, the operational model of the PIP board requires that data to be sent to or received from the payload is first staged in the file system of the PIP board. This allows use of the file transfer mechanisms of the space vehicle to downlink data from the payload. In some embodiments, file transfer operations may occur while the payload is operating. In other words, the PIP board does not need to be switched into maintenance mode, subject to constraints on the attitude of the space vehicle.

Scheduling of payload operations may be managed by the command and data handler (CDH) of the space vehicle. The CDH software and payload scheduler may support the modes of operation of many payloads. The flight software of the CDH may be configurable via a configuration file in JavaScript Object Notation (JSON) format in some embodiments. New configuration files may be uplinked on demand or via periodic update. In some embodiments, the configuration file may describe the format of the standard messages (whether a header is included or not, the trailer, etc.) and/or the exact message contents (e.g., at the character level) for payload-specific messages. By defining the exact contents, preexisting payloads can receive data in the format they need. Flexibility in the standard message formats is intended to simplify development of a payload using the PIP board. A specific payload may only implement one variation of the standard formats in some embodiments.

Payload Scheduler

The CDH may schedule activities based on current space vehicle position, ground positions of interest, etc. Locations of interest may be loaded into the CDH configuration file and scheduling may occur automatically onboard the space vehicle. When a target comes into view, the space vehicle may begin operating a target pass.

Figure 7:
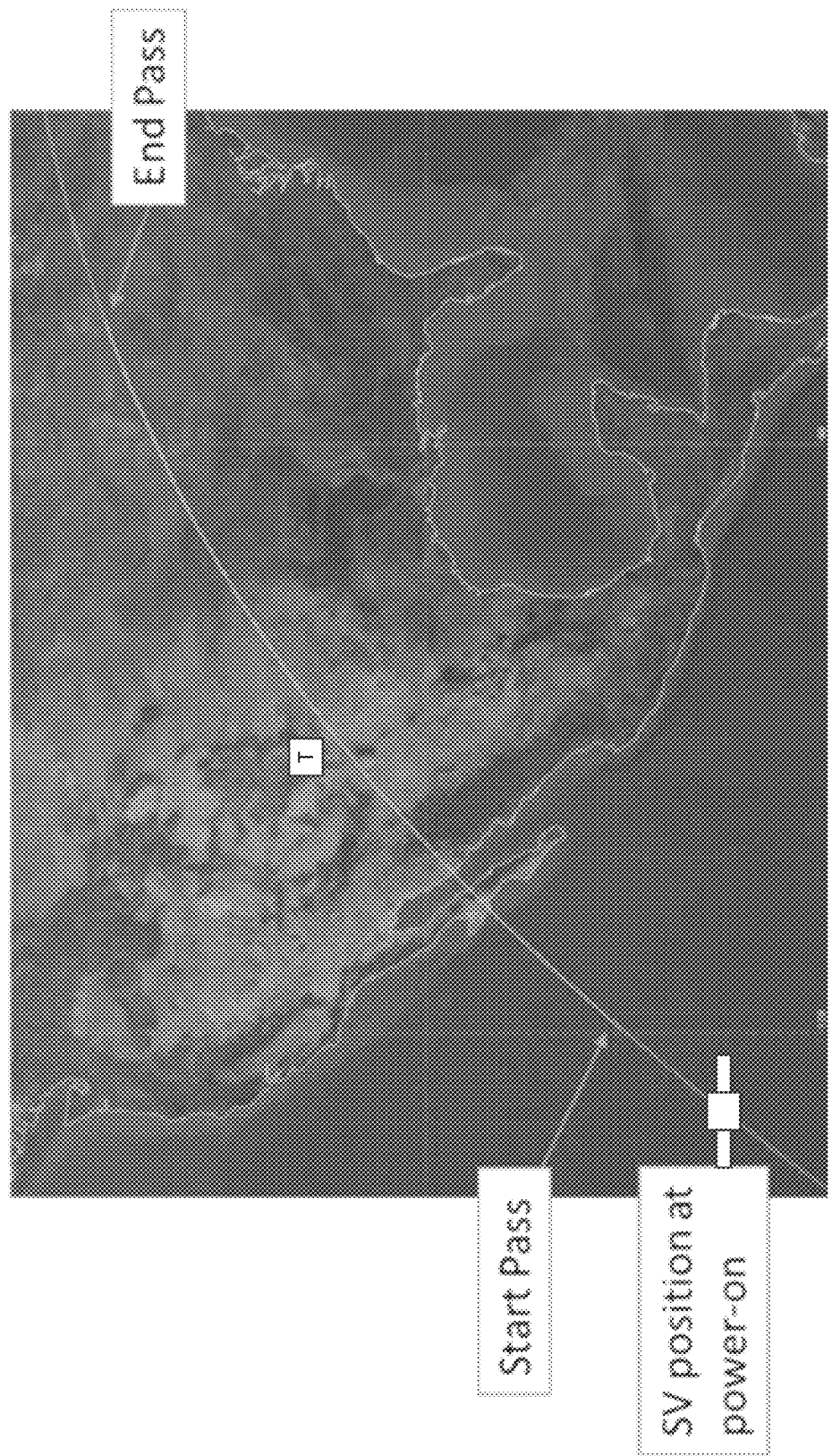
FIG. 7 illustrates a representative space vehicle pass over Los Alamos National Laboratory, according to an embodiment of the present invention.

A representative pass 700 is illustrated in FIG. 7. There are four key transitions in the pass. The pass starts as the space vehicle ascends above the horizon (denoted "T" here) and ends when the space vehicle descends below the horizon with respect to the target. At some point before the start of the pass, the space vehicle may power on and initialize the payload, if not already powered on and initialized previously. At some time after completion of the pass, the payload may be powered off until it is needed again.

The payload scheduler of the space vehicle may support a broad range of payload operations. Each target may include the option, as part of its configuration data, to point the space vehicle at a specific point on the ground or to nadir-point. Payload power can also be enabled a predetermined time or at a predetermined location prior to the target opportunity. This allows the payload to be fully initialized when the target comes into view.

At each of these transition times, the PIP board may need to send commands to the payload to configure and/or control its operation. The configuration file of the PIP board may contain the payload-specific commands used in each transition. This is discussed in more detail in the command processing section below.

The target scheduler may take into consideration the current health of the space vehicle (e.g., remaining power in the battery subsystem) prior to attempting a target pass. A target pass (with or without payload operation) may be skipped in order to preserve space vehicle power, for example.

Pointing Modes

The following pointing modes may be used for payload operations in some embodiments. These modes may be selected in the configuration file on a per-target basis, for example.

Nadir Pointing: The space vehicle is oriented with the +Z axis toward the surface of the Earth.

Zenith Pointing: The space vehicle is oriented with the −Z axis toward the surface of the Earth.

Target Pointing: The space vehicle tracks a specific ground location (e.g., latitude, longitude) and slews to maintain the +Z axis pointed at the target. This is the mode used for "normal" space vehicle target operations.

Anti-Target Pointing: The space vehicle tracks a specific ground location (e.g., latitude, longitude) and slews to maintain the −Z axis pointed at the target. This may enable the section with the payload to be pointed at the target in some embodiments of the space vehicle (e.g., where the payload is located on the bottom of the space vehicle).

None: No active attitude control, so the space vehicle tumbles freely.

Payload-Related CDH Commands

In some embodiments, the following commands may be sent to the CDH of the space vehicle from a ground station to perform payload operations.

TABLE 1

PAYLOAD-RELATED CDH COMMANDS

| Name: | Function: |
| --- | --- |
| Interposer Power Control | Enable/disable power to the payload interposer (and payload) completely |
| Interposer Reset | Assert/de-assert the payload reset pin |

Payload Interposer Commands

Commands can also be sent to the microcontroller of the PIP board in some embodiments. Using the network capabilities of the space vehicle, these commands may be sent to the microcontroller of the PIP board from the CDH or directly from a connected ground station. The PIP board may be assumed to start operation in maintenance mode in some embodiments. A command from the CDH may be used to instruct the PIP board to enter operational mode when payload operations are to be performed.

TABLE 2

PIP BOARD COMMANDS

| Name: | Function: |
| --- | --- |
| Mode Control | Switch between maintenance and operational modes |
| Payload Power Control | Enable/disable power to the payload (note that enabling the power requires two commands in some embodiments: (1) command the CDH to enable the PIP board power; and (2) command the PIP board to enable payload power) |
| Command Sequencer Control | Enable/disable the sequencing of payload commands |
| Payload Data File Management | Commands for managing payload data files |

The microcontroller of the PIP board may also support CDH commands from the space vehicle for reset, file uplink, file downlink, code reprogramming, and logging. After a watchdog reset, the PIP board may restart, but with payload power disabled.

Data Movement

Data for downlink from a payload may be staged onto the PIP board file system first. Payload-specific operations implemented on the microcontroller of the PIP board may be used to accomplish this. Once the data resides in the file system of the PIP board, data movement between the PIP board and a ground station may be performed using the communication systems of the space vehicle (e.g., high gain radio, low gain radio, etc.).

Data that is uplinked to the payload may also first be staged on the PIP board file system. This may be accomplished by receiving the data via the space vehicle communication systems and sending the data to the PIP board via the payload interface connectors thereof (i.e., host side and payload side). Once resident on the PIP board file system, the uplink data may be provided to the payload via the payload interface connectors of the PIP board.

Payload State-of-Health (SOH) Data

The payload may provide SOH data in some embodiments. For instance, in some embodiments, a message of type "H" (see Table 4) arriving at the UART of the PIP board microcontroller may be treated as SOH data. In some embodiments, the SOH data for the payload may be appended to the SOH log for the space vehicle and be downlinked during normal ground segment processing. This SOH data may be integrated into a SOH database of the space vehicle prior to ground station transfer.

PIP/Payload Messages

In some embodiments, standard messages may be used between the PIP board and the payload. For instance, these messages may allow for commanding the payload, transferring data between the PIP board and the payload, and receiving SOH information from the payload. Existing payloads that already have their own command formats can be modified to implement this command sequence, or the software of the PIP board can be customized to implement the existing message format of the payload and translate messages between the space vehicle and the payload.

Payload Command Sequencing

In some embodiments, a command sequencer controls communications between the PIP board and the payload. Command sequencing may be optional and may be defined by entries in a configuration file of the PIP board in some embodiments. This PIP board configuration file may be used to define commands sent by the PIP board via UART, for example, and the expected responses by the payload.

The operation of the payload may be scripted via a list of command-response strings. The microcontroller of the PIP board may transmit each command string to the payload and wait until a response is received. When the expected response is received, the next command-response string in the list may be processed. If an expected response to a command is not received, operation of the command-response list may be stopped.

The PIP board configuration file may control the format of commands and responses. The default mode may be to send commands using the message format defined in Table 3 in some embodiments. This may be changed in some embodiments to use an unformatted (i.e., "raw") mode in which the extract byte strings to be sent are defined in a JSON file.

UART Communication Protocol

In some embodiments, the space vehicle may use the following data frame for transmitting data via serial links. The payload may implement this protocol for communication via the PIP board UART. Some standard messages used in some embodiments are defined in Table 4, while Table 3 below shows an example space vehicle/PIP serial message format.

TABLE 3

SPACE VEHICLE/PIP SERIAL MESSAGE FORMAT

| Content: | Name: | Description: |
| --- | --- | --- |
| ~PL~ | Header | All messages start with a header sequence. |
| <id> | Message Identifier | 8-bit message identifier selected from printable ASCII characters. The |

TABLE 3-continued

SPACE VEHICLE/PIP SERIAL MESSAGE FORMAT

| Content: | Name: | Description: |
|---|---|---|
| | | messages using upper-case letters may be standard. Other message identifiers may be used for custom payload-specific functions. |
| XXXX | Number of Data Bytes | 4-bit hexadecimal representation of the number of data bytes to follow. |
| XX | Packet Data | Data bytes |
| XXXX | CRC | 4-digit hexadecimal representation of the CRC-16 computed over the entire message (header through the end of the data packet). |

In this message format, the cyclical redundancy check (CRC) may be computed using the header, message, and number of data bytes fields as described above. The data bytes may be included in the CRC as 8-bit values.

16-Bit Crc Implementation

The CRC used in the message format may be a 16-bit CRC commonly called the "CRC16-CCITT" in some embodiments. Sources differ on the origin of this version of the CRC algorithm, and various types may be used without deviating from the scope of the invention. An example that may be used by a space vehicle in some embodiments is included below.

```
#include <crc.h>
#include <stdio.h>
#include <stdint.h>
// \brief A 16-bit CRC using 0x1021 for the polynomial. Chuck Forsberg's
// classic implementation from http://wiki.synchro.net/ref:xmodem
// \param crc Initial seed value (use 0xffff)
// \param c_ptr Pointer to region to be checked
// \param len Length of region (bytes)
uint 16_t CRC16 (uint16_t crc, const void *in_ptr, size_t count) {
    const uint8_t *ptr = (const uint8_t *) in_ptr;
    for (unsigned i = 0; i <count; i++) {
        crc ^= (uint16_t) *ptr++ << 8;
        for (unsigned j = 0; j < 8; j += 1) {
            if (crc & 0x8000) {
                crc = crc << 1 ^ 0x1021;
            } else {
                crc <<= 1;
            }
        }
    }
    return crc;
}
```

Semi-Custom Message Formats

Customization of the serial message protocol is supported via the configuration file in some embodiments. The content of the header sequence and trailer sequence in some embodiments is defined in the configuration file items shown in Table 9. The configuration item "Payload:UART:Format" is used to control the encapsulation of the actual output data in some embodiments. The use of the message identifier, data length, and CRC error detection bytes may be selectable as well. Other UART data framing protocols may be supported via customization of the application code of the PIP board microcontroller.

Standard Message Definitions

Messages used in an embodiment are defined below. In this embodiment, upper case letters are predefined. Lower case letters, numbers, etc. may be used for payload-specific functions.

Messages may contain numeric values that are transferred as binary data. Such values may be transferred in the native format used by the space vehicle CDH hardware. Floating-point values may be transferred in the 64-bit IEEE standard format with the least significant byte appearing first in the data record. Integer values may be transferred as 16-bit or 32-bit two's complement values with the least significant byte appearing first in the data record. However, it should be noted that here, and elsewhere herein where data representations/formats are defined, any desired data representations and formats may be used without deviating from the scope of the invention.

TABLE 4

STANDARD MESSAGES

| Message Identifier: | Origin: | Length (bytes): | Contents: |
|---|---|---|---|
| C | PIP | Variable | Command message sent to payload |
| R | Payload | Variable | Response to a command message sent from payload to PIP board |
| D | Payload | Variable | Payload data, appended to current output file |
| P | PIP | Fixed | Space vehicle position, velocity, and time data |
| T | PIP | Fixed | JD2000 time |
| H | Payload | Variable | Payload SOH information |
| All other upper case letters | N/A | Reserved | Reserved for future implementations |

Space Vehicle Command Message

This message is sent by the PIP board to the payload. The contents may be defined in the PIP board configuration file and may be payload-specific. Command and Response messages may be sent in "raw" or "packet" format based on the value of the "Payload:UART:Mode" configuration file item. See Table 9.

Payload Response Message

This message is sent by the payload to the PIP board. The contents of the Response message may be defined in the PIP board configuration file and may be payload-specific. Response messages may be sent in "raw" or "packet" format based on the value of the "Payload:UART:Mode" configuration file item. See Table 9.

Payload Data Message

This message is sent by the payload to the PIP board. The contents and format of this message may be payload-specific. This message may be sent at any time in some embodiments, and may be the expected mechanism for the payload to send data to the PIP board for downlink. The contents of the Payload Data message may be appended to the "current" payload output file.

In addition to the Payload Data message, all data received from the payload over the UART may be appended to the current payload output file by the PIP board in some embodiments. This serves as a transcript of the payload operations and may be downlinked from the PIP board. This data may be useful for diagnosing failures in the payload operations, or for receiving raw data from an existing payload that has not been modified to send the Payload Data message. The payload output file may be available in the file system of the PIP board for later downlink using file transfer capabilities of the space vehicle.

Space Vehicle Position-Velocity-Time (PVT) Message

This message may be periodically sent by the PIP board to the payload. The interval between transmissions of this message may be controlled by the PIP board configuration file. Setting the interval to a certain value (e.g., zero) in some embodiments disables transmission of this message. In some embodiments, the PVT message contains the following data elements, which may also be in the following order.

TABLE 5

PVT MESSAGE CONTENTS

| Name: | Numeric Format: |
|---|---|
| Position X (ECEF Coordinates) | 64 - bit IEEE floating - point, least - significant byte first |
| Position Y (ECEF Coordinates) | 64 - bit IEEE floating - point, least - significant byte first |
| Position Z (ECEF Coordinates) | 64 - bit IEEE floating - point, least - significant byte first |
| Velocity X (ECEF Coordinates) | 64 - bit IEEE floating - point, least - significant byte first |
| Velocity Y (ECEF Coordinates) | 64 - bit IEEE floating - point, least - significant byte first |
| Velocity Z (ECEF Coordinates) | 64 - bit IEEE floating - point, least - significant byte first |
| GPS Week | 32 - bit unsigned integer, least - significant byte first |
| GPS Second of Week | 32 - bit unsigned integer, least - significant byte first |
| JD2000 Time (fractional days) | 64 - bit IEEE floating - point, least - significant byte first |
| Clock Valid Byte | 1 → GPS time is valid; 2 → JD2000 time is valid; 3 → both are valid |

Space Vehicle Time Message

This message may be periodically sent by the PIP board to the payload. The interval between transmissions of this message may be controlled by the PIP board configuration file in some embodiments. Setting the interval to a certain value (e.g., zero) in some embodiments disables transmission of this message. In certain embodiments, the message may contain the following elements in the following order.

TABLE 6

TIME MESSAGE CONTENTS

| Name: | Numeric Format: |
|---|---|
| GPS Week | 16 - bit unsigned integer, least - significant byte first |
| GPS Second of Week | 32 - bit unsigned integer, least - significant byte first |
| JD2000 Time (fractional days) | 64 - bit IEEE floating - point, least - significant byte first |
| Clock Valid Byte | 1 → GPS time is valid; 2 → JD2000 time is valid; 3 → both are valid |

Payload SOH Message

This message may be sent by the payload to the PIP board in some embodiments. The payload may choose to send its SOH message periodically or only a needed. The maximum frequency that the SOH message should be sent is once per second and the recommended interval is once per minute in some embodiments.

The content and format of this message may be payload-specific. In some embodiments, the data portion of this message may contain up to 256 bytes of information. The first 256 bytes of the message may be appended to the space vehicle SOH data file as part of the PIP board SOH in some embodiments. This file may then be downlinked using normal space vehicle capabilities.

Software Development Kit (SDK)

Development of software for the PIP board typically requires detailed payload knowledge. It may be beneficial for payload developers to build and program a custom PIP board, or program a standard PIP board, without knowledge of the internal design and architecture of the space vehicle in order to more rapidly build and deploy payloads for their desired missions. Payload developers may thus be able to program the payload and PIP board with the details of the space vehicle "abstracted" from their perspective.

The PIP board microcontroller in some embodiments is a full participant in the space vehicle network. A full network participant can send and receive data or commands with other participants. For example, the CDH can send commands to the PIP board to power the payload on or off. As another nonlimiting example, a ground-station can send a file to the PIP board that can later be used to update the PIP board software. The payload itself doesn't need to be a participant on the network in some embodiments—activity between the CDH and the payload is mediated by the PIP board. For example, to start a payload operation (e.g., a data collection), the CDH can notify the PIP board, and the PIP board can configure the payload to collect data by using a sequence of commands described in the configuration file. A library implementing the functionality common to all of the space vehicle network boards may be available to payload builders in some embodiments. The common functionality in this library may include, but is not limited to: (1) generic command handlers that allow the microcontroller of the PIP board to act on commands from the ground segment of space vehicle CDH; (2) short and long watchdogs protecting against hardware and software failure on the PIP board microcontroller; (3) an internal time-of-day clock operating in the JD2000 epoch; (4) multiple code bank support, allowing for on-orbit code updates and fallback in the event of failure; (5) file uplink and downlink with error-free transfer and reassembly of files at their destination; (6) lossless file compression and decompression; (7) JSON configuration file support; and/or (8) logging of system errors and forwarding of error logs to the CDH for later downlink.

Configuration Files

The behavior of the space vehicle software may be controlled via configuration files generated and uploaded by the ground station. Per the above, the configuration file may be based on the JSON format. It should be noted that there is an ECMA standard for JSON available at http://www.ecma-international.org/publications/files/ECMA-ST/ECMA-404.pdf. However, other configuration file formats may be used without deviating from the scope of the invention. The ground segment may provide a mechanism to generate and upload the configuration file to the space vehicle CDH and/or the PIP board as required.

CDH Configuration File Items

Configuration file data elements related to payload manager operations in some embodiments are defined in the following tables.

TABLE 7

CDH PAYLOAD MANAGER CONFIGURATION FILE ITEMS

| Name: | Value: | Notes: |
|---|---|---|
| Payload: enable | True/False | Set to true to enable payload operations on the CDH. This enables low-level payload support (e.g., clock setting, network routing, watchdogs, etc.). |
| Payload: expiration | Fractional Days | Number of days to conduct payload operations. After the expiration time, the PIP board may be reset |

TABLE 7-continued

CDH PAYLOAD MANAGER CONFIGURATION FILE ITEMS

| Name: | Value: | Notes: |
|---|---|---|
| | | and payload power may be disabled. |
| Payload:UpdateInterval:Position | 0 to 3600 (seconds) | Time-interval between transmissions of GPS position information between CDH and PIP board. |
| Payload:UpdateInterval:Time | 0 to 3600 (seconds) | Time-interval between transmissions of clock time information between CDH and PIP board. |
| Targets | See Below | Array of target information. |

A list of ground locations (i.e., "targets") may be defined in the configuration file (see examples later herein). Each entry may contain the following payload-related information in some embodiments.

TABLE 8

TARGET-SPECIFIC CDH CONFIGURATION FILE ITEMS

| Name: | Value: | Notes: |
|---|---|---|
| Latitude | Radians | Ground location |
| Longitude | Radians | Ground location |
| Min_elevation | Radians | Minimum elevation angle before attempting to process the target. |
| Operate_payload | True/False | True indicates that the payload is operated for this target; otherwise the target is treated as a normal space vehicle target. |
| LeadTime | Seconds | Begin target processing this amount of time prior to the target achieving its minimum elevation. This allows the payload to startup and initialize before the target is in view. |
| Pointing | None, Nadir, Zenith, Tracking, Anti-Tracking | Selects the pointing mode for this target. |

PIP Board Configuration File Items

The basic configuration items for the PIP board in some embodiments are as follows.

TABLE 9

PIP BOARD CONFIGURATION FILE ITEMS

| Name: | Value: | Notes: |
|---|---|---|
| Payload:UART:speed | 9600, 115200 | UART Baud rate. Default is 115200 bps. |
| Payload:UART:Mode | Packet or Raw | Selects the format used to transmit/receive the command and response values between the PIP board and payload. |
| Payload:UART:Format:Header | ~PL~ | UART protocol header sequence. |
| Payload:UART:Format:MsgId | True/False | If true, include an 8-bit message identifier after the header of the message. |
| Payload:UART:Format:Length | True/False | If true, include a count field after the message identifier field of the message. |

TABLE 9-continued

PIP BOARD CONFIGURATION FILE ITEMS

| Name: | Value: | Notes: |
|---|---|---|
| Payload:UART:Format:Trailer | Usually an empty string "" or absent | UART protocol trailer sequence |
| Payload:UART:Format:CRC | True/False | If true, include the 16-bit CRC at the end of the message (after the trailer). |
| Payload:I2C:address | 7-bit address | Slave I$^2$C address used by thepayload. |
| Payload:I2C:poll_interval | Milliseconds | Interval between successive attempts to poll data from the I$^2$C interface. |
| Payload:sequences:PowerOn | JSON array object of command and response pairs (see Table 11) | Command/Response sequences used when the payload is first powered on. |
| Payload:sequences:StartPass | JSON array object of command and response pairs (see Table 11) | Command/Response sequence used at the start of a payload pass operation. |
| Payload:sequences:EndPass | JSON array object of command and response pairs (see Table 11) | Command/Response sequences used at the end of a payload pass operation. |
| Payload:sequences:PrePowerOff | JSON array object of command and response pairs (see Table 11) | Command/Response sequences used prior to powering down the payload. |
| Payload:UpdateInterval:Position | 0 to 3600 (seconds) | Time interval between transmission of the PVT message from the PIP board to the payload. |
| Payload:UpdateInterval:Time | 0 to 3600 (seconds) | Time interval between transmission of the Time message from the PIP board to the payload. |

When the Payload:UART:Mode object is set to Packet, the command and response strings are sent via the "C" and "R" message types, respectively. In Raw mode, the command and response strings are sent directly to the UART rather than encapsulated in the space vehicle serial protocol described above. This is intended to give some flexibility to the UART communications without requiring modification and re-qualification of the PIP board flight software.

There are four command/response sequences that are used at four moments in the operation of the payload in some embodiments. The sequences may be used to configure the payload at the start and end of a payload pass. The sequences may be sub-objects within the Payload:sequences object. Each sequence may be a JSON array object containing command/response pairs as shown in Table 11. When the payload is powered on by the PIP board microprocessor, the PowerOn command sequence is sent. At the beginning of each payload pass, the StartPass sequence is sent. At the end of a pass, the EndPass sequence is sent. The PrePowerOff sequence is used to notify the payload that it will be powered down and allows time for the payload to prepare for that event. If the payload does not require commanding at these stages of operation, the sequence can be omitted from the configuration file.

Each command sequence may be defined using a JSON array object. Each entry in the array may contain the information in Table 11. Each array element describes an individual command/response string. Non-printable characters may be used in the command and response strings in some embodiments using the JSON notation "\uxx." In some embodiments, only 8-bit characters are supported by the space vehicle, and the value must also contain two hexadecimal digits in certain embodiments (i.e., \u30 and \u65 are allowed, but \u994f and \u33ff are not supported). Embedded NUL characters may be supported and encoded in some embodiments using \u00.

The timeout value is used to halt operation if the expected Response is not received. The Delay value may be used to limit the rate at which Commands are sent to the payload. If the Delay is absent or set to 0 in some embodiments, Commands are sent immediately after the Response has been received.

TABLE 10

DEFINITION OF COMMAND OR RESPONSE MESSAGE

| Name: | Value: | Notes: |
|---|---|---|
| Content | Character String | The message content as a sequence of characters |
| Id | Integer from 0 to 255 | 8-bit message identifier |

TABLE 11

COMMAND/RESPONSE SEQUENCE ITEMS

| Name: | Value: | Notes: |
|---|---|---|
| Delay | Milliseconds | Amount of time to delay before sending the Command string. |
| Command | String | See Table 10 for details. Sent to the payload via UART. |
| Response | String | See Table 10 for details. Expected response to the command. If this string is empty, then no response is expected and sequencing resumes after the pausing for the Timeout interval. |
| Timeout | Milliseconds | Amount of time to wait for the Response string. If the Response doesn't arrive within this time interval, the payload operation may be stopped. |

Sample Configuration Files

A sample JSON configuration file for the CDH is included below.

```
{
    "Satellite": {
        "name": "SV1",
        "version": "0.4",
        "TLE": {
            "cat_num": 39406,
            "epoch": 5148.16192822019,
            "Bstar": 0.00073916,
            "i_0": 0.707052079,
            "Omega_0": 2.85839901982,
            "e_0": 0.0003807,
            "omega_0": 1.91496827397,
            "M_0": 4.37063780488,
            "n_0": 15.23446364
        }
    },
    "Payload": {
        "Power": {
            "pointing" : "Ground"
        }
    },
    "targets" : [
        { "name": "sweden",
          "latitude": +1.1929,
          "longitude": .32979,
          "min_elevation": 0.052359877,
          "min_time": 30,
          "operate_payload" : true
        },
        { "name": "alaska",
          "latitude": +1.1606944,
          "longitude": -2.75235033,
          "min_elevation": 0.052359877,
          "min_time": 30,
          "operate_payload": false
        },
        { "name": "los alamos",
          "latitude": +0.622756,
          "longitude": -1.8544979,
          "min_elevation": 0.052359877,
          "min_time": 30
          "operate_payload" : true
        }
    ],
}
```

A sample JSON configuration file for the PIP board microcontroller is included below.

```
{
"Payload": {
    "UART": {
        "Mode" : "Packet"
        "Speed": 115200
    }
    "sequences": {
    "PowerOn" : [
        { "command" : { "delay" : 125, "content" : "CONFIG x y z",
          "response" : { "content" : "OK", "Id" : 37 } },
        { "command" : { "delay" : 3000, "content" : "SETVALUE a 3",
          "response" : "OK" },
    ],
    "StartPass" : [
        { "command" : "START", "response" : "OK" },
        { "command" : "TRIG", "response" : ""}
    ],
    "EndPass" : [
        { "command" : "STOP", "response" : "OK" },
        { "command" : "OFF", "response" : "" }
    ],
    "PrePowerDown" : [
    ],
    }
}
```

Figure 8:
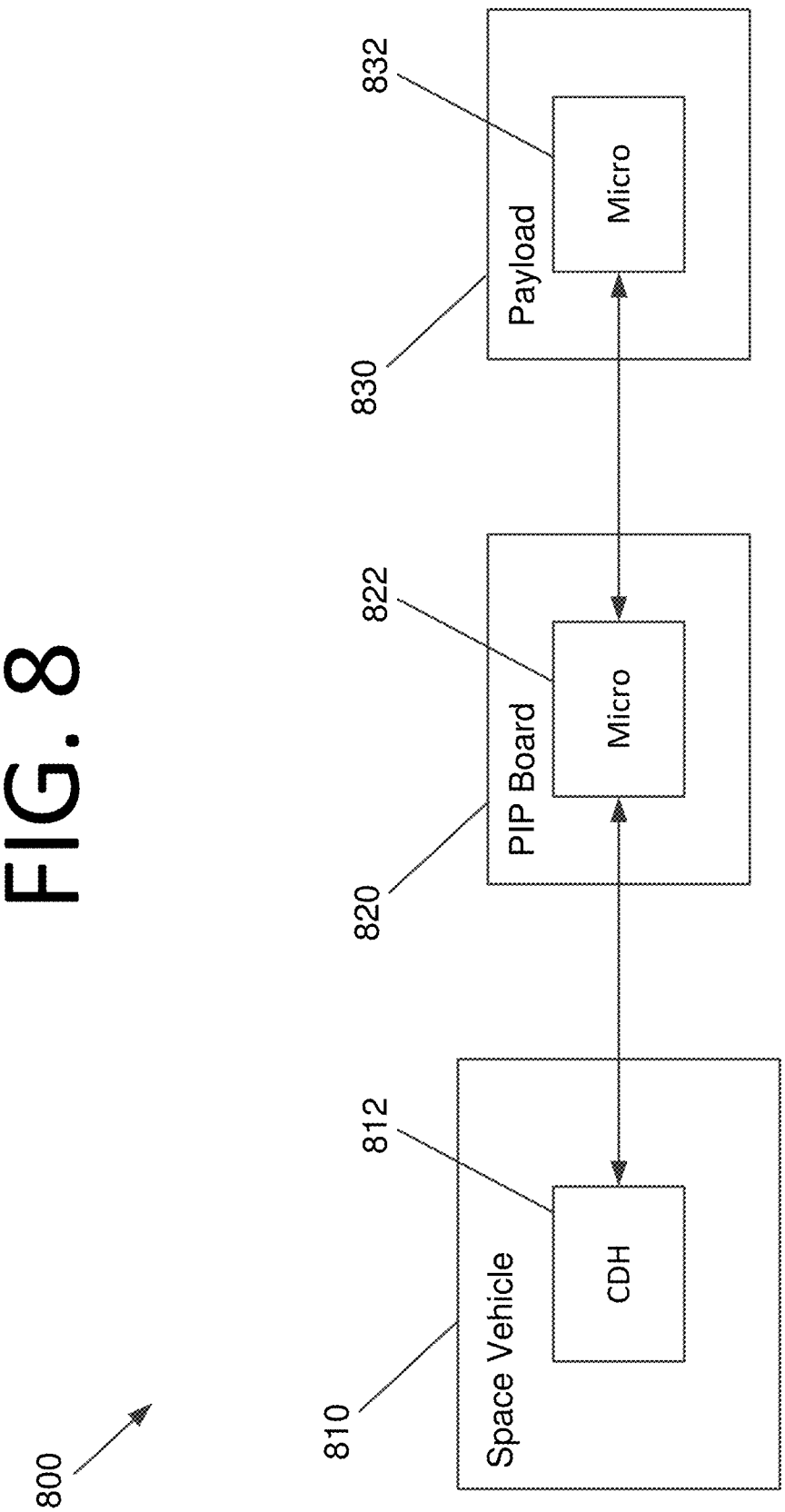
FIG. 8 is an architectural diagram illustrating a space vehicle system, according to an embodiment of the present invention.

FIG. 8 is an architectural diagram illustrating a space vehicle system 800, according to an embodiment of the present invention. System 800 includes a space vehicle 810, a PIP board 820, and a payload 830. Space vehicle 810 includes a CDH 812 and PIP board 820 and payload 830 have microcontrollers 822 832, respectively. CDH 812 is communicates with microcontroller 822 of PIP board 820, and microcontroller 822 communicates with microcontroller 832 of payload 830. In some embodiments, communication between microcontroller 822 and microcontroller 832 may be facilitated via a UART (not shown) that is either part of or accessible by microcontroller 822. Commands and data from CDH 812 and payload data from microcontroller 832 are sent between space vehicle 810 and payload 830 via microcontroller 822. Microcontroller 822 is configured to control operation of payload 830, format messages between space vehicle 810 and the payload 830, and extract data from payload 830 for downlink via space vehicle 810.

In some embodiments, microcontroller 822 is configured to cause PIP board 820 to operate in a maintenance mode or an operational mode depending on a command from space vehicle 810, a ground station, or both. Power to payload 830 is disabled in maintenance mode, and payload 830 is powered in operational mode. In certain embodiments, PIP board 820 includes a file system and microcontroller 822 first stages data to be sent to payload 830 by space vehicle 810 or received from payload 830 by space vehicle 810 in the file system.

In some embodiments, CDH 812 is configured to schedule payload activities based on a current space vehicle position and/or ground positions of interest that are loaded into a CDH configuration file. CDH 812 may be configured to instruct PIP board 820 to power on and initialize payload 830 when space vehicle 810 reaches a predetermined position, space vehicle 810 is approaching a target pass, or both. The CDH configuration file may include data for each target for latitude, longitude, minimum elevation, whether to operate the payload, lead time, and pointing in certain embodiments. In some embodiments, CDH 812 is configured to cause space vehicle 810 to perform nadir pointing, zenith pointing, target pointing, anti-target pointing, or no pointing for a given target based on pointing data in the CDH configuration file.

In some embodiments, CDH 812 is configured to reset, and control power to, PIP board 820 and payload 830. In certain embodiments, CDH 812 is configured to cause PIP board 820 to switch between maintenance and operational modes, enable/disable power to the payload, enable/disable sequencing of payload commands, and provide commands for managing payload data files. In some embodiments, microcontroller 822 is configured to support commands from space vehicle 810 for reset, file uplink, file downlink, code reprogramming, and logging. In certain embodiments, PIP board 820 is configured to receive state-of-health (SOH) data from payload 830, append the payload SOH data to SOH data for PIP board 820, forming combined SPH data, and send the combined SOH data to space vehicle 810 to be downlinked to a ground station.

In some embodiments, microcontroller 822 is configured to perform command sequencing to send commands to, and receive responses from, payload 830, send commands in serial by sending a next command after a response to a previous command is received, and stop operation of a command-response list when an expected response to a command is not received. In certain embodiments, each command and response includes a header, a message identifier, a number of data bytes, packet data, and a CRC. In some embodiments, the PIP board configuration file defines formats of command messages sent from PIP board 820 to payload 830, response messages sent by payload 830, payload data, space vehicle PVT messages, time messages, and payload SOH messages.

In certain embodiments, microcontroller 822 is a full participant in a network of space vehicle 810 and implements functionality common to all boards of the space vehicle network via a library defined in a software development kit (SDK) for payload developers. In some embodiments, the SDK library functionality includes generic command handlers that allow microcontroller 822 to act on commands from a ground segment of CDH 812, short and long watchdogs protecting against hardware and software failure on microcontroller 822, an internal time-of-day clock operating in a predetermined epoch, multiple code bank support that allows for on-orbit code updates and fallback in event of failure, file uplink and downlink with transfer and reassembly of files at their destination, lossless file compression and decompression, configuration file support, logging of system errors and forwarding of error logs to CDH 812 for later downlink, or any combination thereof. In certain embodiments, the CDH configuration file is configured to cause CDH 812 to enable/disable operations of payload 830, provide an amount of time to conduct payload operations, provide an interval between transmissions of GPS information between CDH 812 and PIP board 820, provide an interval between transmissions of time information between CDH 812 and PIP board 820, and provide target information.

Figure 9:
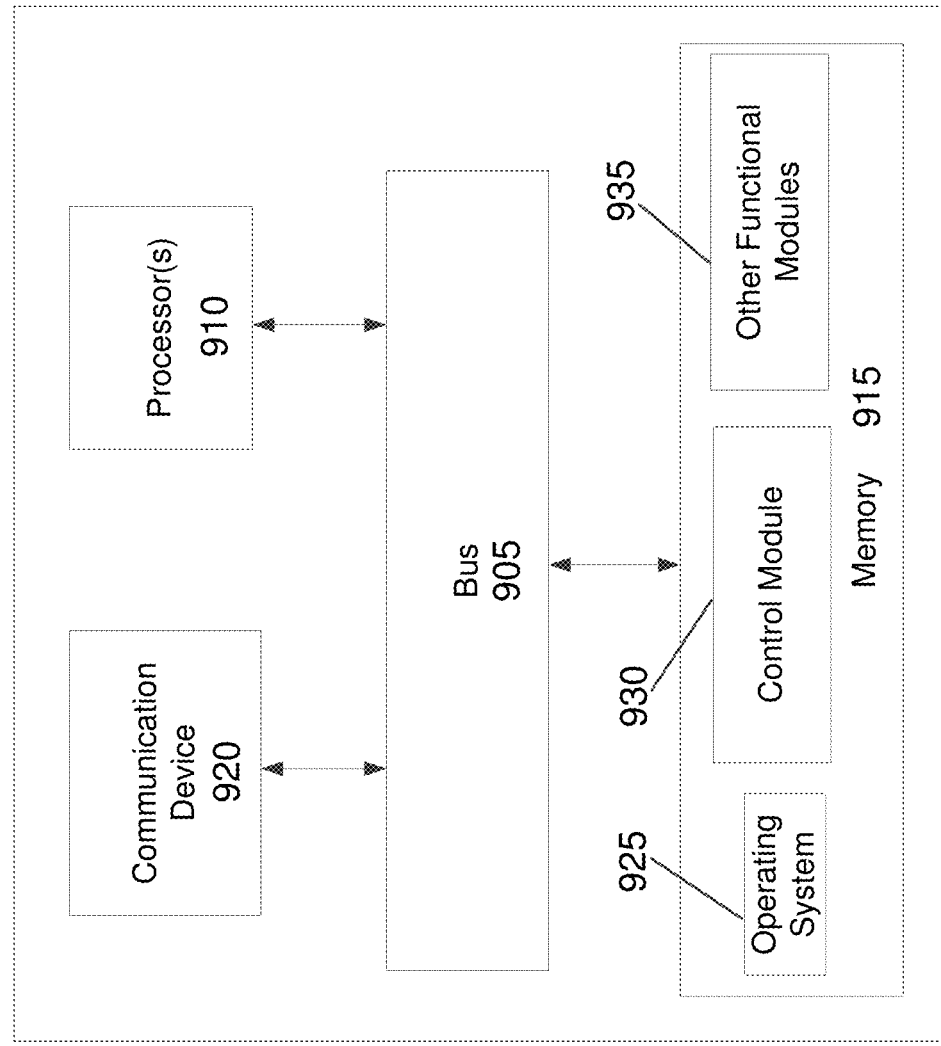
FIG. 9 is a block diagram illustrating a computing system, according to an embodiment of the present invention.

FIG. 9 is a block diagram illustrating a computing system 900, according to an embodiment of the present invention. In some embodiments, computing system 900 may be a CDH of a space vehicle, a microcontroller of a PIP board or a payload, or any other suitable device without deviating from the scope of the invention. Computing system 900 includes a bus 905 or other communication mechanism for communicating information, and processor(s) 910 coupled to bus 905 for processing information. Processor(s) 910 may be any type of general or specific purpose processor, including a central processing unit (CPU), application specific integrated circuit (ASIC), FPGA, or microcontroller. Processor(s) 910 may also have multiple processing cores, and at least some of the cores may be configured to perform specific functions. Multi-parallel processing may be used in some embodiments. Computing system 900 further includes a memory 915 for storing information and instructions to be executed by processor(s) 910. Memory 915 can be comprised of any combination of random access memory RAM, read only memory (ROM), flash memory, cache, static storage such as a magnetic or optical disk, or any other types of non-transitory computer-readable media or combinations thereof. Additionally, computing system 900 includes a communication device 920, such as a transceiver, antenna, and/or UART, to provide access to a communications network of a space vehicle and/or a payload.

Non-transitory computer-readable media may be any available media that can be accessed by processor(s) 910 and may include volatile media, non-volatile media, removable media, non-removable media, and communication media. Communication media may include computer-readable instructions, data structures, program modules or other data in a modulated data signal such as a carrier wave or other transport mechanism and includes any information delivery media.

Memory 915 stores software modules that provide functionality when executed by processor(s) 910. The modules include an operating system 925 for computing system 900. The modules further include a control module 930 that is configured to control a space vehicle, PIP board, and/or payload employing any of the approaches discussed herein or derivatives thereof. Computing system 900 may include one or more additional functional modules 935 that include additional functionality.

One skilled in the art will appreciate that presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of various embodiments of the present invention as claimed, as generally described and illustrated in the figures herein, may be arranged and designed in a wide variety of different configurations. Thus, the detailed description of the embodiments of the present invention, as represented in the attached figures, is not intended to limit the scope of the invention, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A payload interposer (PIP) system, comprising:
a space vehicle comprising a command and data handler (CDH);
a payload; and
a payload interposer (PIP) board comprising a microcontroller, the PIP board facilitating power and communications between the space vehicle and the payload, wherein control software for the microcontroller is configured to:
control operation of the payload,
format messages between the space vehicle and the payload, and
extract data from the payload for downlink via the space vehicle, wherein
the microcontroller of the PIP board is a full participant in a network of the space vehicle and implements functionality common to all boards of the space vehicle network via a library defined in a software development kit (SDK) for payload developers.

2. The PIP system of claim 1, wherein
the microcontroller is configured to cause the PIP board to operate in a maintenance mode or an operational mode depending on a command from the space vehicle, a ground station, or both,
power to the payload is disabled in maintenance mode, and
the payload is powered in operational mode.

3. The PIP system of claim 1, wherein the PIP board comprises a file system and the microcontroller first stages data to be sent to the payload by the space vehicle or received from the payload by the space vehicle in the file system.

4. The PIP system of claim 1, wherein the CDH is configured to schedule payload activities based on a current space vehicle position and/or ground positions of interest that are loaded into a CDH configuration file.

5. The PIP system of claim 4, wherein
the CDH is configured to instruct the PIP board to power on and initialize the payload when the space vehicle reaches a predetermined position, the space vehicle is approaching a target pass, or both, and
the CDH configuration file comprises data for each target for latitude, longitude, minimum elevation, whether to operate the payload, lead time, and pointing.

6. The PIP system of claim 4, wherein the CDH is configured to cause the space vehicle to perform nadir pointing, zenith pointing, target pointing, anti-target pointing, or no pointing for a given target based on pointing data in the CDH configuration file.

7. The PIP system of claim 1, wherein the CDH is configured to reset, and control power to, the PIP board and the payload.

8. The PIP system of claim 1, wherein the CDH is configured to cause the PIP board to switch between maintenance and operational modes, enable/disable power to the payload, enable/disable sequencing of payload commands, and provide commands for managing payload data files.

9. The PIP system of claim 1, wherein the microcontroller is configured to support commands from the space vehicle for reset, file uplink, file downlink, code reprogramming, and logging.

10. The PIP system of claim 1, wherein the PIP board is configured to:
receive state-of-health (SOH) data from the payload;
append the payload SOH data to SOH data for the PIP board, forming combined SPH data; and
send the combined SOH data to the space vehicle to be downlinked to a ground station.

11. The PIP system of claim 1, wherein the microcontroller is configured to:
perform command sequencing to send commands to, and receive responses from, the payload;
send commands in serial by sending a next command after a response to a previous command is received; and
stop operation of a command-response list when an expected response to a command is not received.

12. The PIP system of claim 11, wherein each command and response comprises a header, a message identifier, a number of data bytes, packet data, and a cyclical redundancy check (CRC).

13. The PIP system of claim 1, wherein the PIP board comprises a PIP configuration file that defines formats of command messages sent from the PIP board to the payload, response messages sent by the payload, payload data, space vehicle position, velocity, and time (PVT) messages, time messages, and payload state-of-health (SOH) messages.

14. The PIP system of claim 1, wherein the SDK library functionality comprises generic command handlers that allow the microcontroller of the PIP board to act on commands from a ground segment of space vehicle CDH, short and long watchdogs protecting against hardware and software failure on the PIP board microcontroller, an internal time-of-day clock operating in a predetermined epoch, multiple code bank support that allows for on-orbit code updates and fallback in event of failure, file uplink and downlink with transfer and reassembly of files at their destination, lossless file compression and decompression, configuration file support, logging of system errors and forwarding of error logs to the CDH for later downlink, or any combination thereof.

15. The PIP system of claim 1, wherein
the CDH comprises a configuration file, and
the CDH configuration file is configured to cause the CDH to enable/disable payload operations, provide an amount of time to conduct payload operations, provide an interval between transmissions of global positioning system (GPS) information between the CDH and the PIP board, provide an interval between transmissions of time information between the CDH and the PIP board, and provide target information.

16. A payload interposer (PIP) board, comprising:
memory storing computer program instructions; and
a microcontroller configured to execute the computer program instructions, wherein the instructions are configured to cause the microcontroller to:
control operation of a payload,
format messages between a space vehicle and the payload, and
extract data from the payload for downlink via the space vehicle,
perform command sequencing to send commands to, and receive responses from, the payload,
send commands in serial by sending a next command after a response to a previous command is received, and
stop operation of a command-response list when an expected response to a command is not received.

17. The PIP board of claim 16, wherein the instructions are further configured to cause the microcontroller to:
stage data in a file system of the PIP board before sending the data from the payload to the space vehicle, from the space vehicle to the payload, or both; and
support commands from the space vehicle for reset, file uplink, file downlink, code reprogramming, and logging.

18. A space vehicle, comprising:
a command and data handler (CDH) configured to:
cause a payload interposer (PIP) board to switch between maintenance and operational modes, enable/disable power to a payload, enable/disable sequencing of payload commands, and provide commands for managing payload data files,
schedule activities of the payload based on a current space vehicle position and/or ground positions of interest that are loaded into a CDH configuration file, and
instruct the PIP board to power on and initialize the payload when the space vehicle reaches a predetermined position, the space vehicle is approaching a target pass, or both, wherein
the CDH configuration file comprises data for each target for latitude, longitude, minimum elevation, whether to operate the payload, lead time, and pointing.

* * * * *